(No Model.)

E. L. MANSFIELD.
WORK SUPPORT.

No. 343,381. Patented June 8, 1886.

Witnesses.
S. N. Piper
R. B. Torrey

Inventor.
Edwin L. Mansfield.
by R H Eddy atty.

UNITED STATES PATENT OFFICE.

EDWIN LASELL MANSFIELD, OF BOSTON, MASSACHUSETTS.

WORK-SUPPORT.

SPECIFICATION forming part of Letters Patent No. 343,381, dated June 8, 1886.

Application filed March 29, 1886. Serial No. 196,889. (No model.)

*To all whom it may concern:*

Be it known that I, EDWIN LASELL MANSFIELD, of Boston, in the county of Suffolk, of the Commonwealth of Massachusetts, have invented a new and useful Improvement in Mechanism for Supporting an Article While it is Being Drilled or Bored; and I do hereby declare the same to be described in the following specification, and represented in the accompanying drawings, of which—

Figure 1:
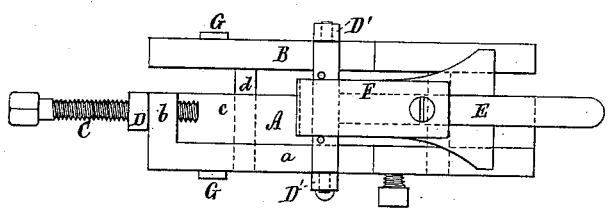
Figure 2:
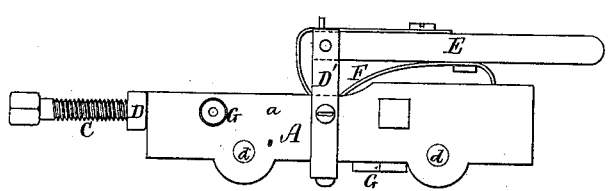
Figure 4:
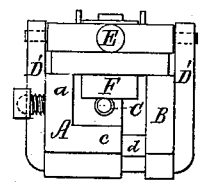
Figure 3:
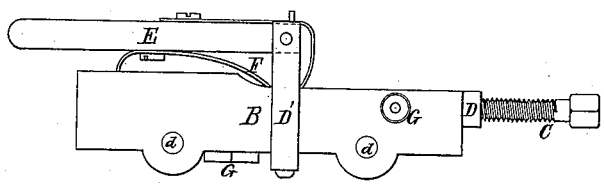
Figure 5:
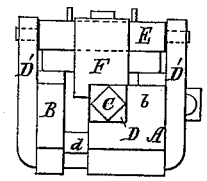
Figure 6:
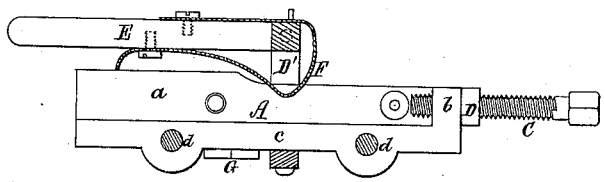

Figure 1 is a top view, Figs. 2 and 3 opposite side elevations, Figs. 4 and 5 opposite end views, and Fig. 6 a longitudinal and median section, of the mechanism constituting my invention, the nature of which is defined in the claims hereinafter presented.

In the said drawings, A denotes a trough open at one side and at one end, the other side, $a$, and end $b$ of the trough being perpendicular to the bottom $c$. Along the open side of the trough and parallel to the closed side $a$ is a bar, B, from which two cylindrical guides, $d$ $d$, are extended into corresponding holes made laterally through the bottom of the trough. A screw, C, provided with a set-nut, D, screws through the fixed end $b$ of the trough. Furthermore, fastened to the trough, and spanning and extending above it, as represented, is a yoke, D', in which is pivoted a lever, E, having a spring, F, shaped as and fastened to and extending about it, as represented.

The trough and the bar B are provided with nipples G, for guiding a boring-tool or drill while boring or drilling a bar or article when held within the trough. The screw C is to determine the distance to which an article may be inserted in the trough A, the bar B being adjustable in distance from the side $a$ of the trough, in order to accommodate the holder to the width of an article placed within it. The lever and spring are to hold the article firmly in place in the trough, while such article may be in the act of being bored or drilled by a tool going through one of the nipples.

I claim—

1. The combination of the trough open at one side and one end, with the adjustable bar and with the yoke, lever, and spring, all being arranged, and such trough and bar being provided with nipples or boring-tool guides, substantially as set forth.

2. The combination of the trough open at one side and one end, and having in the latter the screw with its set-nut, as described, with the adjustable bar and with the yoke, lever, and spring, all being arranged, and such trough and bar being provided with nipples or boring-tool guides, substantially as set forth.

EDWIN LASELL MANSFIELD.

Witnesses:
R. H. EDDY,
R. B. TORREY.